United States Patent Office 3,295,896
Patented Jan. 3, 1967

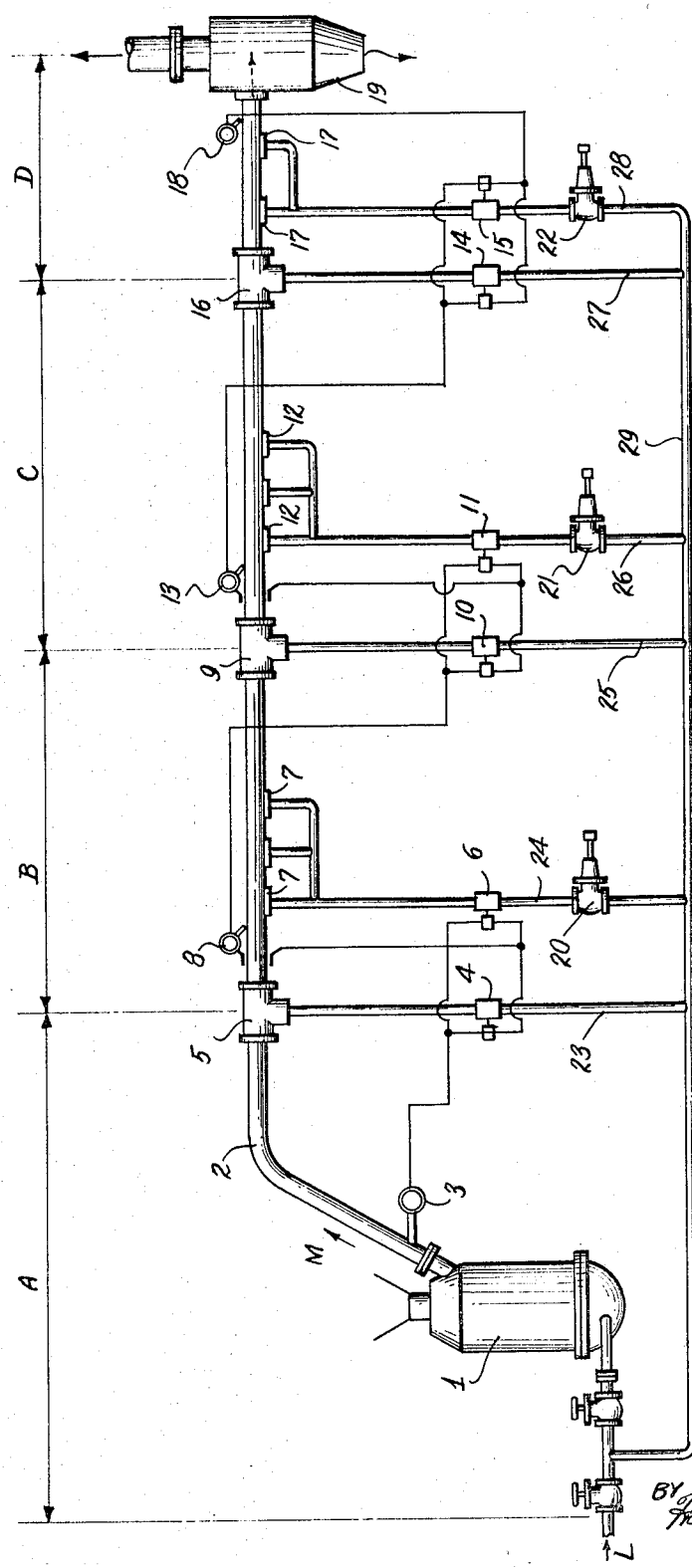

3,295,896
METHOD AND MEANS FOR THE PNEUMATIC TRANSPORT OF BULKY MATERIAL IN DUCTS
Knut Ingvar Hurtig, Terrangvagen 99, Stockholm-Hagersten, Sweden, and Karl Gustav Evert Krantz, Karlavagen 47B, Stockholm, Sweden
Filed July 12, 1965, Ser. No. 470,976
Claims priority, application Sweden, July 14, 1964, 8,565/64
8 Claims. (Cl. 302—26)

The invention relates to a method and means for the pneumatic transport of bulky material in a pulverulent, powdery, granular or fragmented condition along ducts having an intake station and a delivery station at which the material transported is used.

In known pneumatic conveyors, the transport of material of the above nature, for instance, of foundry sand in foundries, and the speed of the material, are controlled by the pressure acting on the material at the intake station. As this pressure must be high enough to carry the material along the full length of the duct, and as a duct is frequently several hundred meters long, the speed of transport may often become excessive; in the case of long ducts, to which the compressed air is continually admitted in large quantities, excessive speed may also be the result of air expansion.

A high speed may be detrimental to the material transported and may also result in considerable wear of the duct and any fittings provided therein, and in excessive air consumption in relation to the quantity of material transported. The speed at the delivery station of the duct may become excessive as a consequence of high air pressure and of any blockages in the duct formed by agglomerations of material therein. This high speed, together with the outflow and expansion of high-pressure air may lead to difficulties at the delivery station. Finally, the distance over which material can be transported in a pneumatic conveyor of the type described is limited, as the air pressure cannot be kept at a sufficiently high level if the duct is very long.

Pneumatic conveyors for bulky material are known in which the operating pressure is kept substantially constant by means of booster units built into a duct at spaced-apart points.

Conveyors of this kind operate quite satisfactorily for the transport of a specific material for which they and the booster units have been specially designed. However, their operation becomes uneconomic and unsatisfactory when used for different kinds of material. Moreover, the consumption of compressed air in the conveyor is always very high because of the continuous supply of fresh compressed air to the booster units, which leads to problems at the delivery station.

It is an object of the present invention to eliminate these drawbacks and to provide a method and means for transporting bulky material along any desired distance and at a desired speed, so that neither the material transported nor the conveyor and its ducts and fittings are adversely affected by excessive speeds and no difficulties are encountered because of material and compressed air being discharged at the delivery station at excessive speeds and pressures.

The invention achieves this object by transporting at an adjustable speed bulky material through a duct from an intake station to a delivery station, the material being divided during its transport into separate lots or batches by means of shut-off valves in said duct, each lot or batch of material being automatically supplied with fresh compressed air for conveying purposes in response to the pressure acting on the preceding lot or batch of material.

According to another aspect of the invention, a pneumatic conveyor plant for bulky material comprises a duct having an intake station at one end and a delivery station at the other end, shut-off valves arranged in said duct at spaced-apart points thereof, said shut-off valves dividing said duct into a series of compartments which can be isolated from each other by said shut-off valves, valves for supplying compressed air for conveying purposes to said compartments, and pressure-responsive means in each compartment for operating both the shut-off valve at the entry end of a compartment and the air-supply valve of the same compartment, said pressure-responsive means being controlled by the air pressure in the preceding compartment.

An embodiment of the invention is shown by way of example in the accompanying drawing which, in a single figure, illustrates diagrammatically the layout of a transport plant according to the invention.

In the drawing, 1 is a container arranged at the intake station for storing the material to be transported. This material, which may be foundry sand, is conveyed in the direction of the arrow M along a duct 2 to a receptacle or hopper 19 at a delivery station. Duct 2 is divided by means of air-operated shut-off valves 5, 9 and 16 into a series of compartments, A, B, C and D. An adjustable measuring instrument 3, for instance, a pressure transducer, which is sensitive to pressure in the duct, is arranged in the first compartment A and in the vicinity of container 1. The pressure transducer 3 emits impulses to two solenoid-controlled valves 4 and 6 when the pressure in the compartment A for which the pressure transducer is set is exceeded. The valve 4 is built into a branch-line 23 of the main line 29 into which compressed air is fed from a source, not shown, in the direction of the arrow L. The control valve 4, when open, admits compressed air to the operating mechanism of valve 5, whereby the latter is closed. The solenoid-operated valve 6 is built into a branch-line 24 of the line 29 and admits compressed air to a number of fluidising cells 7 which feed compressed air to the compartment B of duct 2. Compartment B extends from the valve 5 to the valve 9. Compressed air fed through the fluidising cells 7 assists in the continued transportation of material through compartment B. The air pressure in that compartment is controlled by a pressure transducer 8 arranged in proximity to valve 5 and operating in a manner similar to transducer 3. As soon as the maximum pressure in the compartment B for which the transducer 8 has been set is exceeded, the latter sends an impulse to a solenoid-operated valve 10 arranged in a branch-line 25, whereby the valve 9 is closed, and an impulse sent to solenoid-operated valve 21 in a branch-line 26, whereby compressed air is fed through fluidising cells 12 to the next compartment C of the duct. At the same time as the valve 9 is closed, the transducer 8 opens the valve 5 through the solenoid-operated valve 4 and closes the solenoid-operated valve 6, so that the supply of compressed air to the cells 7 is stopped.

The material which was in the compartment A between the container 1 and the valve 5 is now transported through compartment B, a cushion of air being formed between the material and the closed valve 9 at the end of that compartment. The same process is carried out in the succeeding compartment C with the aid of the pressure transducer 13, the solenoid-operated valves 14 and 15 in the branch-lines 27 and 28 respectively, the shut-off valve 16, the fluidising cells 17, the shut-off valve 9 and the solenoid-operated valves 10 and 11.

By conveying the material in stages and against cushions of compressed air, the speed of transport is reduced without shocks. When the shut-off valves 5, 9 and 16 are opened, the pressure acting in the compartments B, C and D respectively is increased by the expanding air cushions.

When the material is transported through the last compartment D on its way to the receptacle 19, the pressure in that compartment drops to the level of the discharge pressure. The pressure transducer 18 of compartment D is set for this minimum pressure, the transducer 18 opening the solenoid-operated valve 14 and the shut-off valve 16 when this pressure has been reached, and stopping the supply of air to the fluidising cells 17 by means of the solenoid-operated valve 15.

Reducing valves 20 and 21 are preferably built into the branch-lines 24 and 26 respectively, in order that the fluidising cells 7 and 12 receive compressed air at a pressure which matches the maximum pressure at which the pressure transducers 8 and 13 are set. Reducing valves arranged in sequence may be set to the gradually falling pressure in successive compartments. A reducing valve 22 is arranged in branch-line 28 which leads to fluidising cells 17 of the last compartment D. This reducing valve is set at a pressure which suffices for the final stage of the transport and for the delivery and for a sufficiently large volume of air.

The method and means according to the invention achieve a transport of material through a duct at an automatically controlled speed and at an automatically controlled pressure in different compartments, independently of the length of the duct and its dimensions, and of the number of compartments.

Furthermore, the conveyor plant according to the invention can be easily adapted to the transport of different quantities and materials by varying the settings of the pressure transducers and, if necessary, of those of the reducing valves.

We claim:
1. A method for the pneumatic transport of bulky material in ducts comprising transporting at an adjustable speed said material through a duct from an intake station to a delivery station, the material being divided during its transport into separate lots or batches by means of shut-off valves in said duct, a lot or batch of material being automatically supplied with fresh or compressed air for conveying purposes in response to pressure acting on the preceding lot or batch of material.

2. A method according to claim 1, in which compressed air is fed to the different compartments through lines branched off a line which supplies compressed air to the intake station.

3. A pneumatic conveyor for bulky material comprising a duct having an intake station at one end and a delivery station at the other end, shut-off valves arranged in said duct at spaced-apart points thereof, said shut-off valves dividing said duct into a series of compartments which can be isolated from each other by said shut-off valves for supplying compressed air for conveying purposes to said compartments, and pressure-responsive means in each compartment for operating both the shut-off valve at the entry end of a compartment and the air-supply valve of the same compartment, said pressure-responsive means being controlled by the air pressure in the preceding compartment.

4. A conveyor according to claim 3, in which the means responsive to the pressure in the compartments arranged in advance of the shut-off valves comprise a pressure transducer.

5. A conveyor according to claim 4, in which each pressure transducer is adapted to emit impulses to a solenoid-controlled valve provided for the closure of the shut-off valve at the end of the compartment into which the pressure transducer is built, when the predetermined pressure for which the pressure transducer is set is exceeded.

6. A conveyor according to claim 4, in which each pressure transducer is adapted to emit impulses to a solenoid-controlled valve provided for the supply of compressed air through fluidising cells to that compartment which follows the compartment into which the pressure transducer is built when the predetermined pressure for which the pressure transducer is set is exceeded.

7. A conveyor according to claim 4, in which each pressure transducer is adapted to emit impulses to a solenoid-controlled valve provided for the opening of the shut-off valve arranged at the exit end of a compartment simultaneously with the emission of impulses by the same pressure transducer to solenoid-controlled valves for the closure of the shut-off valves arranged at the entry end of the same compartment.

8. A conveyor according to claim 3, in which the last compartment of the duct contains a pressure transducer adapted to emit impulses to solenoid-controlled valves for opening the shut-off valve at the existing end of that compartment and for interrupting the supply of compressed air to the fluidising cells of that compartment when the pressure has reached the minimum value to which the pressure transducer in that compartment is set.

References Cited by the Examiner

UNITED STATES PATENTS 1,051,905  2/1913  McCord _____ 302—24

FOREIGN PATENTS 1,150,320  6/1963  Germany.

ANDRES H. NIELSEN, *Primary Examiner.*
EVON C. BLUNK, *Examiner.*